Nov. 21, 1967     R. E. COULSON     3,353,832
SEALING ASSEMBLY
Filed May 24, 1965
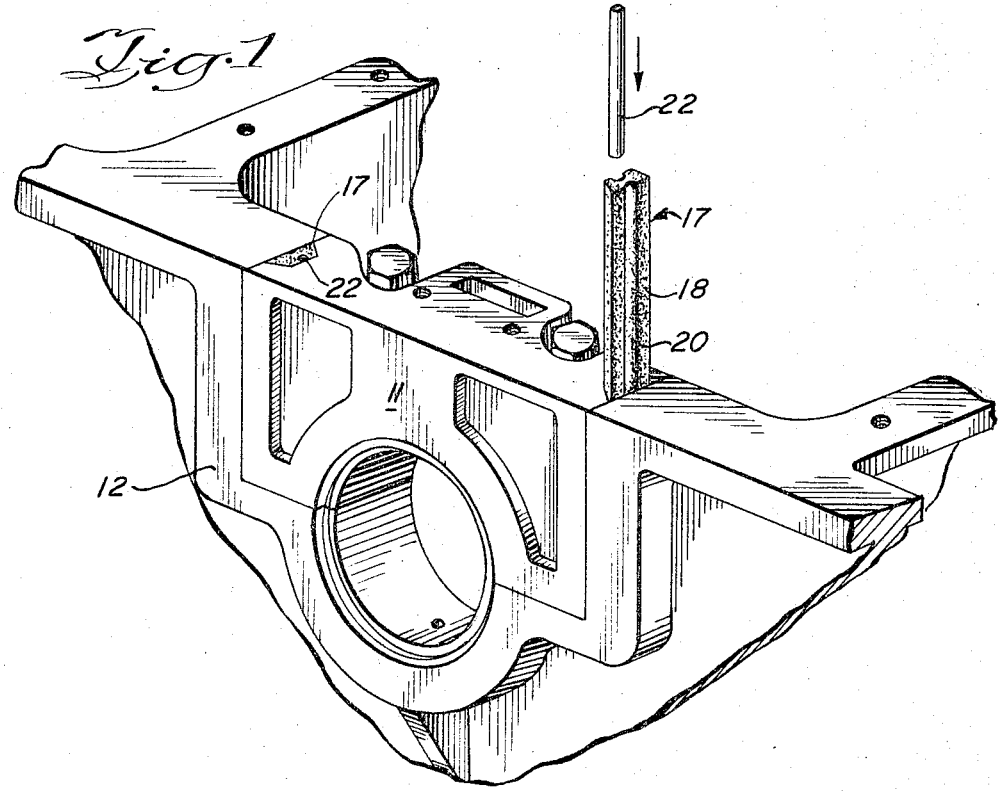
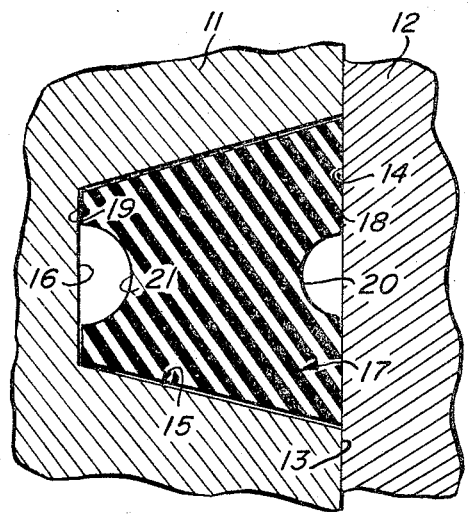
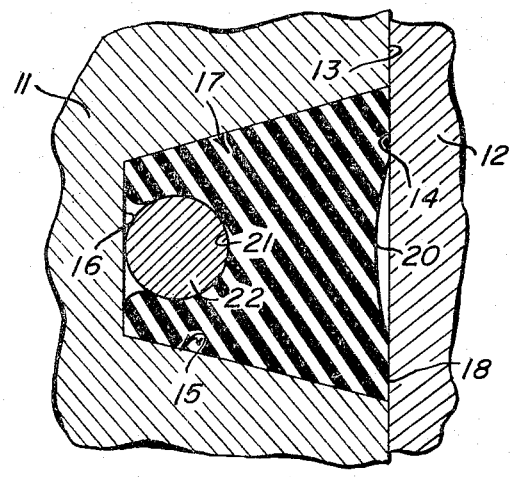
INVENTOR
Robert E. Coulson
By Dressler, Goldsmith, Clement, Gordon & Ladd
ATTORNEYS United States Patent Office 3,353,832
Patented Nov. 21, 1967

3,353,832
SEALING ASSEMBLY
Robert E. Coulson, Chicago, Ill., assignor to Felt Products Mfg. Co., a corporation of Delaware
Filed May 24, 1965, Ser. No. 458,116
3 Claims. (Cl. 277—171)

ABSTRACT OF THE DISCLOSURE

A seal for preventing leakage between two mating surfaces in the form of a wedge having two parallel sides of different widths and a groove in its narrower parallel side where a member can be introduced therein to force the seal into sealing engagement with the mating surfaces.

This invention relates to a sealing assembly adapted to be positioned within a recess formed in one of two abutting members to seal the joint between said abutting members.

One example of the type of sealed joint to which this invention relates is the joint between the rear main bearing cap and the crankcase of an automobile engine. For convenience, the invention will be described with particular reference to said joint, but it should be understood that the invention is not limited to such structure, and that the advantages of the invention may be utilized in many different environments.

In accordance with the present invention one of the two members defining a joint to be sealed is provided with a longitudinal recess and a sealing assembly is positioned in the recess. The sealing assembly includes a sealing strip shaped to fit within said recess, and means such as a pin that is applied against one surface of the sealing strip to force the opposite surface of said sealing strip into sealing engagement with the adjacent surface of the other member. The pin exerts a constant pressure against the sealing strip to hold it in sealing engagement so as to maintain an efficient seal.

An illustrative embodiment of the invention and a structure by means of which the above and other advantages of the invention are attained is described in detail in the following specification, taken in conjunction with the accompanying drawings, in which:

FIGURE 1 is a perspective view of a bearing cap mounted in one end of a crankcase with a sealing assembly in sealing position on one edge of the bearing cap, and another sealing assembly ready for insertion at the opposite edge of the sealing cap;

FIGURE 2 is an enlarged cross-sectional view of the sealing strip and the recess in which it is positioned; and FIGURE 3 is a view similar to FIGURE 2, but with a wire rod inserted in a groove in the sealing strip.

In the drawings, a bearing cap 11 is mounted in one end of a crankcase 12, and the mating surfaces 13 and 14 of the bearing cap and crankcase, respectively, define a joint that must be sealed to prevent oil leaking from the crankcase through said joint. The bearing cap is provided with a recess 15 which extends across the joint between the abutting surfaces 13 and 14. The recess is wedge-shaped in cross section and has an open side contiguous to the surface 14. The back wall 16 of the recess is narrower than the open side of the recess and is parallel thereto.

A molded elastomeric sealing strip 17 is positioned in the recess 15 after the bearing cap is mounted in the end of the crankcase. The sealing strip is made of material that swells when it absorbs oil so as to maintain an effective seal when used in an automobile engine. Preferably, the sealing strip has "neoprene" rubber or styrene butadiene rubber as its basic constituent. The sealing strip is wedge-shaped in cross section and has two oppositely disposed parallel surfaces 18 and 19 that are provided with longitudinally extending grooves 20 and 21, respectively. The surface 18 of the sealing strip, which is adapted to engage the surface 14 of the crankcase, is wider than the opposite surface 19 which is positioned adjacent the back wall 16 of the recess 15 when the sealing strip is positioned in the recess 15.

Although the sealing strip is shaped to conform to the shape of the recess 15 and is dimensioned to fit in said recess, it is desirable to lubricate the outer surfaces of the sealing strip lightly with oil or grease to facilitate insertion of the sealing strip in the recess 15. The sealing strip is manually pushed into the recess 15 as far as possible. Then a wire rod 22, preferably of the same length as the sealing strip, is pushed into the groove 21 between the sealing strip and the back wall 16 of the recess 15. The wire 22 is pushed inwardly longitudinally of the groove 21 until its entering end is flush with the corresponding end of the sealing strip. The wire rod and the sealing strip are then clamped together, as by pliers, and are pushed inwardly of the recess 15 as a single unit. The wire rod imparts rigidity to the unit, so that if the sealing strip cannot be pushed to the end of the recess, the unit may be hammered into its final position.

The wire rod may be of any desired cross-sectional configuration, but preferably is cylindrical, and its cross-sectional area is larger than the cross-sectional area of the groove 21. Accordingly, as the wire rod is pushed into the groove 21 it crowds the sealing strip 17 toward the surface 14 to force the surface 18 of the sealing strip into sealing engagement with said surface 14 and to hold it in said position. The groove 20 imparts some flexibility to the wider parallel side of the sealing strip to facilitate pushing the wire rod and sealing strip inwardly of the recess 15 as a unit during the latter portion of the inward movement of the sealing strip.

Although a preferred embodiment of the invention has been described in considerable detail, it will be understood that the description thereof is intended to be illustrative, rather than restrictive, as many details of structure may be modified or changed without departing from the spirit and scope of the invention. Accordingly, it is not desired to be restricted to the exact structure described.

What is claimed is:

1. A sealing assembly to prevent leakage between two mating surfaces, one of said mating surfaces defining a wedge-shaped recess having an open side contiguous to said mating surfaces, said sealing assembly comprising a wedge-shaped sealing strip having two parallel sides of different widths, said sealing strip being disposed in said recess with its wider parallel side adapted to engage said other mating surface, said sealing strip defining a groove in its narrower parallel side, and means disposed in said groove for forcing said sealing strip into sealing engagement with said other mating surface.

2. A sealing assembly to prevent leakage between two mating surfaces, one of said surfaces defining a wedge-shaped recess having an open side contiguous to said other surface, a wedge-shaped sealing strip having two parallel sides of different widths, said sealing strip being disposed in said recess with its wider parallel side adapted to engage said other surface, said sealing strip defining a groove in its narrower parallel side, and a rod having a cross section larger than the cross section of said groove, said rod being disposed in said groove, whereby said sealing strip is forced into sealing engagement with said other surface.

3. A sealing assembly to prevent leakage between two mating surfaces, one of said surfaces defining a recess of wedge-shaped cross section having an open side contiguous to said other surface, an elastomeric sealing strip of generally wedge-shaped cross section fitted within said recess, said sealing strip having one side adjacent said other surface and a second side spaced from said first mentioned side, said second side defining a longitudinal groove extending the entire length of said sealing strip, and a wire rod positioned in said groove, said rod having a cross-sectional area larger than the cross-sectional area of said groove, whereby said rod exerts force against said sealing strip to hold said first mentioned side in sealing engagement with said other surface.

References Cited

UNITED STATES PATENTS

| | | | |
|---|---|---|---|
| 2,392,182 | 1/1946 | Payne | 277—171 X |
| 2,657,675 | 11/1953 | McGower | 308—23 |
| 2,731,284 | 1/1956 | Chambers et al. | 277—179 |
| 2,892,644 | 8/1959 | Collins | 277—171 |
| 2,935,349 | 5/1960 | Burch | 277—190 X |
| 3,169,776 | 2/1965 | Felt | 277—125 |

SAMUEL ROTHBERG, *Primary Examiner.*